United States Patent [19]

Miyata

[11] 3,945,836

[45] Mar. 23, 1976

[54] INK COMPOSITION

[75] Inventor: Fumio Miyata, Kyoto, Japan

[73] Assignee: Sakura Color Products Corporation, Osaka, Japan

[22] Filed: Apr. 5, 1973

[21] Appl. No.: 348,050

[30] Foreign Application Priority Data
Apr. 10, 1972  Japan................................ 47-36282

[52] U.S. Cl. ...................... 106/22; 106/28; 106/29; 106/30; 260/37 R; 260/DIG. 38
[51] Int. Cl.$^2$.....................C08L 93/04; C09D 11/08; C09D 11/16
[58] Field of Search ............... 8/6, 1 B, 1 S, 39, 40, 8/84; 106/22, 23, 28, 29, 30, 239, 241; 260/DIG. 38, 37

[56] References Cited

UNITED STATES PATENTS

| | | | |
|---|---|---|---|
| 2,567,963 | 9/1951 | Petke | 106/22 |
| 2,989,360 | 6/1961 | Mautner | 8/93 X |
| 3,306,867 | 2/1967 | Popiolek | 106/23 X |

FOREIGN PATENTS OR APPLICATIONS 836,921   6/1960   United Kingdom................. 106/23

OTHER PUBLICATIONS

Kirk–Othmer, *Encyclopedia of Chemical Technology*, Vol. 17, p. 501.

Apps, *Printing Ink Technology*, Published by Leonard Hill (Books) Ltd., London, 1958, pp. 148, 149, 176, 177 relied on.

*Primary Examiner*—Joan E. Welcome
*Attorney, Agent, or Firm*—Toren, McGeady and Stanger

[57]      ABSTRACT

An ink composition which comprises an aliphatic hydrocarbon solvent having dissolved therein a resinous binder and a modified dye, said modified dye being a reaction product obtained by reacting a dye having at least one group of $-CO_2M$ and $-SO_3M$ in the molecule wherein M is an alkali metal with an organic ammonium compound.

4 Claims, No Drawings

INK COMPOSITION

The present invention relates to ink compositions, more particularly to an ink composition especially suitable for a marking pen.

Presently, inks prepared by dissolving an oil-soluble dye and resin in xylene are mainly employed for marking pens which are extensively used at home, school, office, etc. as writing and drawing implements. However, xylene has the objections of: (1) giving off a vapor having a strong odor to intensely stimulate the eyes, nose and throat, (2) causing troubles in the marrow when inhaled over a prolonged period of time even in a very small amount, and (3) producing dermatitis when xylene contacts the skin repeatedly. For this reason, it has been desired to provide an ink for marking pens (hereinafter referred to briefly as "ink" unless otherwise specified) prepared by using a solvent of weak odor and low toxicity. In fact, inks have recently become available which are prepared by dissolving an oil- or alcohol-soluble dye and resin in methyl cellosolve of a low odor. Although methyl cellosolve is weak in odor, it is as toxic as xylene and involves the hazard that the vapor of the ink will be inhaled by the user or the ink will contact his skin. Thus the ink proposed has not overcome the objections heretofore experienced. Furthermore, when a drawing or writing is made on paper or the like with the conventional ink, the dye continues to sublime from the ink-deposited portion even after the ink has been dried, with the result that the color transfers to paper, cloth or the like which comes into contact with the inked portion, which in turn undergoes fading.

It is known that an aliphatic hydrocarbon solvent is weak in odor and much lower than xylene or cellosolve in toxicity to the human body, but the use of this solvent is infeasible inasmuch as at present there is no dye available that is soluble therein to a concentration required for the ink. Indeed, when the solvent is used for the known dyes, low dye concentrations will inevitably result to give light colors.

Accordingly, a main object of this invention is to provide a dye which is readily soluble in a substantially odorless and nontoxic aliphatic hydrocarbon solvent to a high concentration.

Another object of this invention is to provide a dye which will not sublime from the ink-deposited portion after it has been dried.

Another object of this invention is to provide an ink which is low in odor and toxicity such that it will not adversely affect the human body even when used over a long period of time.

Still another object of this invention is to provide an ink having a high concentration of dye and excellent in tinctorial properties.

Other objects and features of this invention will become more apparent from the following description.

The present invention provides an ink composition which comprises an aliphatic hydrocarbon solvent having dissolved therein a resinous binder and a dye, said dye being a modified dye obtained by reacting (a) a dye having at least one group of $-CO_2M$ and $-SO_3M$ in the molecule wherein M is an alkali metal with (b) an organic ammonium compound represented by the formula

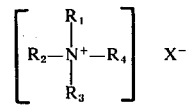   (I),

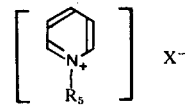   (II) or

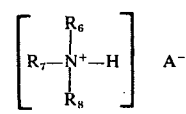   (III)

wherein $R_1$, $R_2$, $R_3$, $R_4$ and $R_5$ are respectively a hydrocarbon radical having 1 to 40 carbon atoms, a radical of a hydrocarbon bonded to a hydrocarbon by a divalent group of $-O-$, $-S-$, $-COO-$, $-CONH-$ or $-NH-$, the total carbon number of both hydrocarbons bonded being in the range of 2 to 40, or

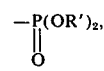

R' being an alkyl having 1 to 15 carbon atoms or an alkenyl having 1 to 20 carbon atoms, provided that the total carbon number of $R_1$, $R_2$, $R_3$ and $R_4$ is in the range of 11 to 55: $R_6$, $R_7$ and $R_8$ are respectively a hydrogen atom, a hydrocarbon radical having 1 to 40 carbon atoms, a radical of a hydrocarbon bonded to a hydrocarbon by a divalent group of $-O-$, $-S-$, $-COO-$, $-CONH-$ or $-NH-$, the total carbon number of both hydrocarbons bonded being in the range of 2 to 40, or

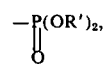

R' being an alkyl having 1 to 15 carbon atoms or an alkenyl having 1 to 20 carbon atoms, provided that all of $R_6$, $R_7$ and $R_8$ are not hydrogen atom and the total carbon number of $R_6$, $R_7$ and $R_8$ is in the range of 8 to 40: X is a halogen atom and A is an acid residue. According to the researches of the present inventor it has been found that a modified dye obtained by reacting a dye having at least one of $CO_2M$ groups and $SO_3M$ groups with an organic ammonium compound represented by the formula (I), (II) or (III) dissolves in an aliphatic hydrocarbon solvent to a very high concentration, making it possible to obtain an ink of deep color without using xylene, cellosolve or like solvent which is detrimental to the human body. The reason why the reaction product described above is highly soluble in an aliphatic hydrocarbon solvent has not been fully clarified yet.

Further this invention assures greatly reduced sublimation of dye from the inked portion after the ink has been dried, consequently eliminating the transfer of color to paper, cloth or the like which will contact the inked portion and permitting hardly any fading of color in the inked portion over a long period of time.

The dyes to be used according to this invention are those having at least one of $-CO_2M$ groups and $-SO_3M$ groups wherein M is as defined above and include various dyes such as monoazo dyes, disazo dyes, trisazo dyes, polyazo dyes, anthraquinone dyes, triphenylmethane dyes, xanthen dyes, stilbene dyes and indigo dyes. These dyes are used singly or in combination with one another.

Examples of dyes to be used in this invention are shown below, all of which are indicated in accordance with Colour Index (2nd ed.) edited by The American Association of Textile Chemist and Colorists, U.S.A. and The Society of Dyers and Colourists, Great Britain:

1. Monoazo dyes:
Direct Yellow 8, 27, 28,
Acid Yellow 11, 17, 23, 25, 29, 36, 40, 76, 98, 99,
Direct Red 20,
Acid Red 1, 6, 8, 9, 13, 14, 18, 26, 27, 32, 35, 37, 42, 133, 155, 180, 183, 184, 186, 198, 249, 265,
Acid Blue 92, 117, 158, 161,
Direct Orange 39, 41,
Acid Orange 1, 7, 8, 10, 19, 20, 28, 41, 78,
Acid Violet 7, 11,
Acid Green 12, 35,
Acid Brown 2, 4, 20
Acid Black 51, 52, 107.

2. Disazo dyes:
Direct Yellow 1, 12, 24, 33, 44,
Acid Yellow 38, 42, 44,
Direct Red 1, 2, 4, 13, 17, 23, 24, 28, 31, 33, 37, 39, 44, 46, 62, 63, 75, 79, 81, 83, 229,
Acid Red 85, 89, 97, 111, 114, 115, 134, 145, 154, 158, No. 26670,
Direct Blue 1, 2, 6, 15, 22, 25, 76, 90, 98, 158, 165, 168, 226,
Acid Blue 29, 113, 120, 123,
Direct Black 17, 51,
Acid Orange 24, 33, 45, 51, 56
Direct Violet 1, 7, 9, 12, 22, 35, 48, 51, 63,
Acid Green 19, 20,
Acid Brown 14,
Direct Orange 1, 6, 8, 10, 26, 29, 49, 102,
Direct Brown 2, 58, 59,
Acid Black 1, 7, 24, 26, No. 20510.

3. Trisazo dyes:
Direct Blue 71, 78, 120, 163,
Direct Green 1, 6, 8, 33, 59,
Direct Brown 1A, 6, 27, 95, 101, 173,
Acid Black 94.

Polyazo dyes:
Direct Yellow 60,
Direct Red 32, 80, 84, 194,
Direct Blue 131, 150, 159, 162, 175, 176,
Direct Brown 13, 14, 31, 33, 39, 43, 44, 63, 70, 73, 74, 100, 127, 149, 150, 215,
Acid Brown 25, 92, 106, 119, 120, 123,
Direct Black 19, 22, 28, 32, 34, 75, 76, 77, 97, 100, 112.

5. Anthraquinone dyes:
Acid Red 80, 82, 83,
Acid Blue 23, 25, 27, 40, 41, 43, 45, 67, 78, 80, 138,
Acid Violet 34, 41, 43, 51, No. 62000,
Acid Green 25, 27, 36, 41, 44,
Acid Brown 27,
Acid Black 48.

6. Triphenylmethane dyes:
Acid Blue 1, 7, 9, 15, 22, 83, 90, 93, 100, 103, 104,
Direct Blue 41,
Acid Violet 15, 49,
Acid Green 3, 9, 16.

7. Xanthene dyes:
Acid Yellow 73, 74,
Acid Red 51, 52, 87, 91, 92, 93, 94, 95, 98,
Acid Blue 19
Acid Violet 9.

8. Stilbene dyes:
Direct Yellow 11, 39.

9. Indigo dyes:
Acid Blue 74.

Among these dyes, preferable are those having one to two —$CO_2M$ groups, one to two —$SO_3M$ groups or both —$CO_2M$ group and —$SO_3M$ group wherein M is sodium.

The organic ammonium compounds to be reacted with the dyes according to this invention are represented by the formulas (I), (II) and (III) and used singly or in combination with one another. Insofar as the definitions with respect to the carbon number are fulfilled, the hydrocarbon radicals represented by the $R_1$ to $R_8$ may be either a saturated or unsaturated cyclic hydrocarbon radical or saturated or unsaturated chain hydrocarbon radical respectively having or not having substituents. Typical of the organic ammonium compounds to be used in this invention are shown in Tables 1 – 3 below:

I. Examples of quaternary ammonium halides represented by the formula (I) are shown in Table 1:

Table 1

| Compound No. | Name of organic ammonium compound |
|---|---|
| (1) | Octyl tributyl ammonium halide |
| (2) | Decyl tripropyl ammonium halide |
| (3) | Dodecyl triethyl ammonium halide |
| (4) | Tetradecyl trimethyl ammonium halide |
| (5) | Hexadecyl trimethyl ammonium halide |
| (6) | Octadecyl trimethyl ammonium halide |
| (7) | Docosyl trimethyl ammonium halide |
| (8) | Hexacosyl trimethyl ammonium halide |
| (9) | Triacontyl trimethyl ammonium halide |
| (10) | Hexacontyl trimethyl ammonium halide |
| (11) | Octadecenyl triethyl ammonium halide |
| (12) | Didodecyl diethyl ammonium halide |
| (13) | Ditetradecyl diethyl ammonium halide |
| (14) | Dihexadecyl dimethyl ammonium halide |
| (15) | Octadecyl octadecenyl dimethyl ammonium halide |
| (16) | Hexadecyl octadecyl dimethyl ammonium halide |
| (17) | Trioctyl ethyl ammonium halide |
| (18) | Tridecyl methyl ammonium halide |
| (19) | Didodecyl hexadecyl methyl ammonium halide |
| (20) | Dioctadecyl octyl methyl ammonium halide |
| (21) | Dodecylamidomethyl triethyl ammonium halide |
| (22) | Hexadecylamidopropyl trimethyl ammonium halide |
| (23) | Tetradecylaminomethyl trimethyl ammonium halide |
| (24) | Hexacosylaminomethyl dimethyl ammonium halide |
| (25) | Lauroylethyl octyl dimethyl ammonium halide |
| (26) | Stearoylmethyl octyl dimethyl ammonium halide |
| (27) | Oleyloxibutyl trimethyl ammonium halide |
| (28) | Octylthioethyl trimethyl ammonium halide |
| (29) | Didodecyloxiphosphoryl trimethyl ammonium halide |
| (30) | Dioleyloxiphosphoryl triethyl ammonium halide |
| (31) | Oxistearyl trimethyl ammonium halide |
| (32) | Dodecylchlorobenzyl trimethyl ammonium halide |
| (33) | Hexadecyl aminopropyl dimethyl ammonium halide |
| (34) | Octylbenzyl trimethyl ammonium halide |
| (35) | Dodecylbenzyl trimethyl ammonium halide |

Table 1-continued

| Compound No. | Name of organic ammonium compound |
|---|---|
| (36) | Hexadecylbenzyl trimethyl ammonium halide |
| (37) | Butylcyclohexyl trimethyl ammonium halide |
| (38) | Octylcyclohexyl trimethyl ammonium halide |
| (39) | Octylnaphtyl trimethyl ammonium halide |
| (40) | Didecylbenzyl dimethyl ammonium halide |
| (41) | Decyl octylbenzyl dimethyl ammonium halide |
| (42) | Dodecylhexyl cyclohexyl ammonium halide |

II. Examples of pyridinium halides represented by the formula (II) are shown in Table 2 below:

Table 2

| Compound No. | Name of organic ammonium compound |
|---|---|
| (43) | N-octyl pyridinium halide |
| (44) | N-decyl pyridinium halide |
| (45) | N-dodecyl pyridinium halide |
| (46) | N-tetradecyl pyridinium halide |
| (47) | N-hexadecyl pyridinium halide |
| (48) | N-octadecyl pyridinium halide |
| (49) | N-docosyl pyridinium halide |
| (50) | N-hexacosyl pyridinium halide |
| (51) | N-triacosyl pyridinium halide |
| (52) | N-hexacontyl pyridinium halide |
| (53) | N-octadecenylamidomethyl pyridinium halide |
| (54) | N-hexadecenylamidopropyl pyridinium halide |
| (55) | N-tetradecylaminomethyl pyridinium halide |
| (55) | N-tetradecylaminomethyl pyridinium halide |
| (56) | N-methyl-N-octadecylaminomethyl pyridinium halide |
| (57) | N-lauroylethyl pyridinium halide |
| (58) | N-stearoylmethyl pyridinium halide |
| (59) | N-octadecenyloxibutyl pyridinium halide |
| (60) | N-hexadecenylthioethyl pyridinium halide |
| (61) | N-didodecyloxiphosphoryl pyridinium halide |
| (62) | N-decylbenzyl pyridinium halide |
| (63) | N-octadecylbenzyl pyridinium halide |
| (64) | N-hexadecylcyclohexyl pyridinium halide |
| (65) | N-dodecylcyclohexyl pyridinium halide |

III. Examples of organic and inorganic acid salts of primary, secondary and tertiary amines represnted by the formula (III) are acid salts such as hydrochlorides, formates, acetates, lactates etc., which are shown in Table 3 below:

Table 3

| Compound No. | Name of organic ammonium compound |
|---|---|
| (66) | Octyl amine hydrochloride |
| (67) | Decyl amine hydrochloride |
| (68) | Dodecyl amine hydrochloride |
| (69) | Octadecyl amine hydrochloride |
| (70) | Docosyl amine hydrochloride |
| (71) | Triacontyl amine hydrochloride |
| (72) | Octylbenzyl amine hydrochloride |
| (73) | Hexylbenzyl amine hydrochloride |
| (74) | Hexadecylamidopropyl amine hydrochloride |
| (75) | Tetradecylaminomethyl amine hydrochloride |
| (76) | Octadecenyloxibutyl amine hydrochloride |
| (77) | Hexadecylthioethyl amine hydrochloride |
| (78) | Didecylphosphoryl amine hydrochloride |
| (79) | Tetradecyl amine sulphate |

Table 3-continued

| Compound No. | Name of organic ammonium compound |
|---|---|
| (80) | Decylclohexyl amine sulphate |
| (81) | Hexacontyl amine nitrate |
| (82) | Dodecylcyclohexenyl amine nitrate |
| (83) | Octadecenyl amine phosphate |
| (84) | Hexadecyl amine acetate |
| (85) | Octadecenylamidomethyl amine acetate |
| (86) | Hexacosyl amine lactate |
| (87) | Lauroylethyl amine lactate |
| (88) | Hexadecyl ethyl amine hydrochloride |
| (89) | Hexadecyl methyl amine hydrochloride |
| (90) | Didecyl amine hydrochloride |
| (91) | Dihexylbenzyl amine hydrochloride |
| (92) | Dibutylcyclohexyl amine hydrochloride |
| (93) | Dioctadecyl amine formate |
| (94) | Octyl butyl amine acetate |
| (95) | Dodecyl propyl amine acetate |
| (96) | Octyl propyl ethyl amine hydrochloride |
| (97) | Octadecyl dimethyl amine hydrochloride |
| (98) | Tridecyl amine hydrochloride |
| (99) | Dodecyl ethyl methyl amine acetate |

Among these typical organic ammonium compounds, particularly advantageous are: (a) quaternary ammonium chlorides represented by the formula (I) above, (b) pyridinium chlorides represented by the formula (II) above and (c) primary, secondary and tertiary amine hydrochlorides represented by the formula (III) above.

The modified dye of the present invention can be prepared by the reaction of a dye having at least one of $CO_2M$ groups and $SO_3M$ groups with an organic ammonium compound represented by the formula (I), (II) or (III). The reaction can be conducted in water or organic solvent with stirring at a temperature from about 20° to about 70°C, preferably of about 40° to 50°C. The resultant reaction mixture is washed with water to separate the modified dye, followed by drying. The organic ammonium compound represented by the formula (I), (II) or (III) is used in an amount of at least one mole per mole of the dye. When the dye contains two or more substituents represented by —COOM and/or $SO_3M$, the organic ammonium compound can be employed in such an amount that at least one of the above substituents contained in the dye molecule is reacted with the organic ammonium compound. Examples of the organic solvents used in the reaction to prepare the modified dye are alcohols, ketones, ethers, esters, aromatic solvents, aliphatic hydrocarbons, alcyclic hydrocarbons, etc., among which preferable are alcohols, ketones and ethers. The above reaction of dye with organic ammonium compound can be conducted prior to or simultaneously with the preparation of the present ink composition. In the latter case it is preferable to first dissolve a resinous binder in aliphatic hydrocarbon serving as a solvent for the ink composition and thereafter to add the dye and organic ammonium compound thereto for the reaction conducted in the same manner as above.

The resultant modified dye has a structure in which at least one of —COOM and/or $SO_3M$ contained in the molecule is reacted with one mole of the organic ammonium compound, is insoluble in water but soluble in an aliphatic hydrocarbon, and has the same colour as the original dye.

The aliphatic hydrocarbon solvents to be used in this invention which may differ with the type of the dye used, the desired concentration of ink, etc. are preferably those boiling at about 75° to 180°C from the viewpoint of preservability of ink over a prolonged period of time and drying speed after drawing or writing. Such solvents can be used alone or in admixture with one another and typical examples thereof are:

I. Hydrocarbons of methane series: heptane, octane, nonane, decane and like normal paraffins, isooctane and like isoparaffins, II. Hydrocarbons of ethylene series: 1-heptene, 1-octene, 1-nonene, etc.

III. Ligroin, petroleum spirit, refined gasoline and like aliphatic hydrocarbon solvent mixtures.

The resinuous binder to be used in the invention, which assures satisfacory adhesion of the ink on the drawing or writing surface, includes various natural or synthetic resins heretofore used in marking pen inks. Typical of resinous binders are:

1. Rosin derivatives: pentaerythritol-rosin ester, pentaerythritolhydrogenated rosin ester, ester gum, hydrogenated resin, maleinized rosin, etc.
2. Petroleum resins: coumarone-indene resin, polyolefin, etc.
3. alkyd resins: alkyd resins modified with drying oil or rosin, phenolated alkyd resin, styrenated alkyd resin, etc.

Among these resins, preferable are pentaerythritol-rosin ester, pentaerythritol-hydrogenated rosin ester, ester gum, hydrogenated rosin, maleinized rosin and polyolefin.

The concentration of the modified dye and resinuous binder in the present ink composition varies widely with the kind of modified dye and aliphatic hydrocarbon solvent used, etc. Usually, the concentration of modified dye is in the range of 5 to 20%, preferably 5 to 15% by weight and that of resinuous binder is in the range of 5 to 35 %, preferably 10 to 20% by weight, based on the total weight of the ink composition.

The ink composition of this invention is prepared by adding the modified dye previously prepared as above to an aliphatic hydrocarbon solvent along with the resinuous binder and stirring the mixture at a temperature from about 20° to about 70°C to completely dissolve the modified dye and the resinous binder in the solvent. Alternatively, the ink composition of this invention is prepared by adding a dye, organic ammonium compound and resinuous binder to an aliphatic hydrocarbon solvent at the same time or in suitable sequence and stirring the mixture at a temperature from about 20° to 70°C to produce modified dye completely dissolved in the solvent along with the resinuous binder. In the latter case, it is preferable to prepare the ink composition by dissolving the resinuous binder, the organic ammonium compound and the dye in sequence in order to increase the solubility of the modified dye to the aliphatic hydrocarbon solvent. To the ink composition of the present invention can be added further one or more dyes in order to change the colour tone.

To clarify the features of this invention, examples are given below in which parts are all by weight.

EXAMPLE 1

Predetermined amounts of dyes and quaternary ammonium chlorides (I) shown in Table 4 below were respectively added to 130 parts of water, and the mixtures were stirred at 40° to 50°C for about 20 minutes and the resultant precipitates in the mixture were filtered off. After repeatedly washed with water and dried, the precipitates were subjected to extraction with 100 parts of toluene. When the toluene was evaporated off under a reduced pressure, purified modified dyes were obtained as shown in Table 4 below, all of which were insoluble in water and soluble in aliphatic hydrocarbon solvent and had the same colour as the original dyes.

Table 4

| No. | Dye Name*[1] | Amount used (part) | Quaternary ammonium chloride Comp. No*[2] | Amount used (part) | Amount of modified dye obtained (part) |
|---|---|---|---|---|---|
| 1 | D.Y. 27 | 7 | 1 | 8 | 13 |
| 2 | A.Y. 29 | 8 | 2 | 6 | 13 |
| 3 | A.Y. 76 | 6 | 3 | 4 | 8.5 |
| 4 | A.Y. 76 | 6 | 4 | 10 | 14.5 |
| 5 | A.R. 8 | 7 | 5 | 10 | 15 |
| 6 | A.Br.20 | 8 | 6 | 6 | 12 |
| 7 | D.R. 1 | 7 | 7 | 10 | 15 |
| 8 | D.R. 13 | 7 | 8 | 8 | 14.5 |
| 9 | D.Blu.22 | 5 | 9 | 8 | 11.5 |
| 10 | D.Bla.17 | 8 | 10 | 9 | 15 |
| 11 | D.V. 22 | 6 | 11 | 8 | 13 |

Note:
*[1] "D.Y.", "A.Y.", "A.R.", "A.Br.", "D.R.", "D.Blu.", "D.Bla." and "D.V." respectively stand for "Direct Yellow", "Acid Yellow", "Acid Red", "Acid Brown", "Direct Red", "Direct Blue", "Direct Black" and "Direct Violet".
*[2] Compound Nos. 1 to 11 respectively correspond to compound Nos. 1 to 11 attached to the examples of quaternary ammonium halides shown in Table 1 before.

Then predetermined amounts of the modified dyes obtained as above and pentaerythritol-resin ester ("Pentaester", trademark, product of Tokushima Seiyu Co., Ltd., Japan) were added to predetermined amounts of refined gasoline ("Rubbersol", trademark, product of Kyodo Petroleum Co., Ltd., Japan) to obtain the ink compositions as shown in Table 5 below.

Table 5

| No. | Amount of modified dye used (part) | Amount of pentaerythritol-rosin ester used (part) | Amount of refined gasoline used (part) | Colour of the ink composition |
|---|---|---|---|---|
| 1 | 6 | 15 | 79 | Lemon yellow |
| 2 | 6 | 15 | 79 | Yellow |
| 3 | 6 | 15 | 79 | Yellow |
| 4 | 6 | 15 | 79 | Yellow |
| 5 | 6 | 16 | 78 | Magenta |
| 6 | 8 | 16 | 76 | Brown |
| 7 | 8 | 17 | 75 | Red |
| 8 | 8 | 16 | 76 | Dark purple |
| 9 | 6 | 12 | 82 | Green |
| 10 | 11 | 13 | 76 | Purplish black |
| 11 | 7 | 16 | 77 | Purple |

Every ink composition obtained as above tinctured a drawing surface satisfactorily in a deep color, was weak in odor, produced hardly any stimulation on the skin, and no color transfer was found on paper which was held in intimate contact with the drawing surface for a long period of over one month.

EXAMPLE 2

Predetermined amounts of dyes and quaternary ammonium chlorides [formula (I)] shown in Table 6 below were respectively added to 130 parts of ethanol, and the mixtures were stirred at 40° to 50°C for about 20 minutes. 300 parts of cold water was then slowly added to the mixtures, and the resultant precipitates were filtered off, followed by the same procedure as in Example 1 to obtain purified modified dye shown in Table 6 below, all of which were insoluble in water and soluble in aliphatic hydrocarbon solvent and had the same colour as the original dyes.

Table 6

| No. | Dye Name*¹ | Amount used (part) | Quaternary ammonium chloride Comp. No.*² | Amount used (part) | Amount of modified dye obtained (part) |
|-----|-----------|--------------------|------------------------------------------|--------------------|---------------------------------------|
| 12 | D.G. 1 | 7 | 13 | 12 | 16 |
| 13 | D.Br.44 | 7 | 15 | 12 | 16 |
| 14 | A.Blu.43 | 6 | 17 | 8 | 12 |
| 15 | A.Blu.100 | 6 | 20 | 5 | 10 |
| 16 | A.Y. 40 | 8 | 22 | 6 | 12 |
| 17 | D.R. 20 | 7 | 23 | 9 | 15 |
| 18 | A.R. 184 | 7 | 26 | 7 | 11.5 |
| 19 | A.R. 186 | 6 | 27 | 9 | 13 |
| 20 | A.O. 7 | 8 | 28 | 7 | 13.5 |
| 21 | A.O. 41 | 7 | 29 | 6 | 11.5 |
| 22 | D.Y. 24 | 6 | 32 | 8 | 12 |
| 23 | D.R. 39 | 7 | 33 | 9 | 15 |
| 24 | D.R. 44 | 7 | 35 | 8 | 13.5 |
| 25 | A.R. 111 | 7 | 39 | 7 | 12 |
| 26 | D.Blu. 165 | 6 | 41 | 7 | 11.5 |
| 27 | A.Blu. 113 | 6 | 42 | 7 | 11.5 |

Note:
*¹"D.G.", "D.Br.", "A.Blu." and "A.O." respectively stand for "Direct Green", "Direct Brown", "Acid Blue" and "Acid Orange", and "A.Y.", "D.R.", "A.R.", "D.Y.", "D.R." and "D.Blu." are the same as in Example 1.
*²Compound Nos. 13 to 42 respectively correspond to compound Nos. 13 to 42 attached to the examples of quaternary ammonium halides shown in Table 1 before.

Then predetermined amounts of modified dyes obtained as above and resinuous binders were dissolved in predetermined amounts of solvents to obtain the ink compositions shown in Table 7 below.

Table 7

| No. | Amount of modified dye used (part) | Amount of resinous binder used (part) | Solvent used (part) | | Colour of the ink composition |
|-----|-----|-----|-----|-----|-----|
| 12 | 9 | 15*¹ | Refined gasoline*⁴ (65) | | Green |
| 13 | 10 | 12*¹ | Petroleum spirit (60) | | Yellowish brown |
| 14 | 11 | 13*¹ | Petroleum spirit (65) | + n-Octane (5) | Blue |
| 15 | 9 | 14*¹ | Aliphatic hydro-*⁵ carbon (20) | + Refined*⁴ gasoline (60) | Blue |
| 16 | 11 | 18*¹ | Refined gasoline*⁴ (60) | | Yellow |
| 17 | 13 | 15*² | Petroleum spirit (30) | + n-Octane (20) | Red |
| 18 | 10 | 18*² | Aliphatic hydro-*⁵ carbon (20) | + n-Octane (35) | Reddish brown |
| 19 | 11 | 13*² | Aliphatic hydro-*⁵ carbon (35) | + n-Heptane (25) | Crimson |
| 20 | 11 | 17*² | Aliphatic hydro-*⁵ carbon (30) | + n-Heptane (20) | Reddish yellow |
| 21 | 10 | 14*² | Ligroin (15) | + n-Octane (40) | Yellowish orange |
| 22 | 10 | 15*² | Ligroin (30) | + n-Octane (30) | Dark yellow |
| 23 | 13 | 15*² | Ligroin (60) | | Bluish red |
| 24 | 11 | 18*² | Refined gasoline*⁴ (20) | + n-Heptane (30) | Purplish red |
| 25 | 12 | 13*³ | Petroleum spirit (30) | + n-Heptane (20) | Red |
| 26 | 11 | 15*³ | Petroleum spirit (70) | | Blue |
| 27 | 11 | 15*³ | Petroleum spirit | | Purplish blue |

Table 7-continued

| No. | Amount of modified dye used (part) | Amount of resinous binder used (part) | Solvent used (part) | Colour of the ink composition |
| --- | --- | --- | --- | --- |
| | | | (70) | |

Note:
*¹ Pentacrythritol-hydrogenated rosin eater, "Pentaester H", trademark, product of Tokushima Seiyu Co., Ltd., Japan.
*²Polyolefin, "Petrosin 120", trademark, product of Mitsui Petrochemical Co., Ltd., Japan.
*³Hydrogenated rosin, product of Tokushima Seiyu Co., Ltd., Japan.
*⁴"Rubbersol" the same as in Example 1.
*⁵"Isoper E", trademark, product of Esso Petrochemical Co., Ltd., Japan.

Every ink composition obtained as above had distinguished properties the same as the compositions obtained in Example 1.

EXAMPLE 3

From dyes and pyridinium chlorides as shown in Table 8 below modified dyes were obtained by the similar procedure as in Example 2 except that ethyl cellosolve was used instead of ethanol. All of the modified dyes thus obtained were soluble in aliphatic hydrocarbon solvent and insoluble in water and had the same colours as the original dyes.

Table 8

| No. | Dye Name*¹ | Dye Amount used (part) | Pyridinium chloride Comp. No.*² | Pyridinium chloride Amount used (part) | Amount of modified dye obtained (part) |
| --- | --- | --- | --- | --- | --- |
| 28 | D.V. 7 | 6 | 43 | 5 | 9.5 |
| 29 | D.O. 8 | 8 | 46 | 8 | 14 |
| 30 | D.Br. 1A | 8 | 49 | 10 | 16.5 |
| 31 | D.Br. 95 | 9 | 51 | 12 | 19.5 |
| 32 | D.Bla.19 | 10 | 53 | 10 | 18 |
| 33 | A.Blu.41 | 6 | 50 | 5 | 10 |
| 34 | A.G. 44 | 7 | 57 | 7 | 13 |
| 35 | A.Blu.83 | 7 | 59 | 5 | 10.5 |
| 36 | A.Blu.90 | 7 | 60 | 5 | 10 |
| 37 | A.Blu.93 | 8 | 61 | 10 | 16 |
| 38 | D.Y. 39 | 7 | 63 | 6 | 11.5 |
| 39 | D.Y. 8 | 6 | 64 | 6 | 10 |

Note:
*¹"D.O." and "A.G." respectively stand for "Direct Orange" and "Acid Green", and "D.V.", "D.Br.", "D.Bla.", "A.Blu." and "D.Y." are the same as in Examples 1 and 2.
*²Compound Nos. 43 to 64 respectively correspond to compound Nos. 43 to 64 attached to the examples of pyridinium halides shown in Table 2 before.

Ink compositions were prepared by dissolving the modified dyes obtained as in Table 8 above and resinuous binders in solvents as shown in Table 9 below.

Table 9

| No. | Amount of modified dye used (part) | Amount of resinous binder used (part) | Solvent used (part) | | Colour of the ink composition |
| --- | --- | --- | --- | --- | --- |
| 28 | 10 | 19*¹ | Refined gasoline*⁴ (30) | + n-Heptane (15) | Reddish purple |
| 29 | 13 | 17*¹ | Refined gasoline*⁴ (30) | + n-Octane (20) | Orange |
| 30 | 15 | 16*¹ | Ligroin (35) | + n-Octane (30) | Reddish yellow |
| 31 | 15 | 16*² | Refined gasoline*⁴ (40) | + n-Heptane (20) | Yellowish brown |
| 32 | 17 | 15*² | Refined gasoline*⁴ (50) | | Greenish black |
| 33 | 9 | 14*² | Refined gasoline*⁴ (55) | | Blue |
| 34 | 12 | 15*² | Refined gasoline*⁴ (35) | + n-Heptane (30) | Green |
| 35 | 9 | 16*² | Ligroin (60) | | Blue |
| 36 | 9 | 13*² | Ligroin (30) | + n-Heptane (20) | Blue |
| 37 | 15 | 12*² | Ligroin (70) | | Blue |
| 38 | 12 | 17*² | Petroleum spirit (35) | + n-Heptane (40) | Yellow |
| 39 | 10 | 13*³ | Refined gasoline*⁴ (60) | | Yellow |

Note:
*¹Hydrogenated rosin, product of Tokushima Seiyu Co., Ltd., Japan.
*²Polyolefin, "Nisseki Neopolymer 120", trademark, product of Nippon Oil Co., Ltd., Japan.
*³Polyolefin, "Nisseki Neopolymer 140", trademark, product of Nippon Oil Co., Ltd., Japan.
*⁴"Rubbersol" the same as in Example 1.

EXAMPLE 4

Modified dyes were obtained from dyes and acid salts of amines [formula (III)] as shown in Table 10 below by the similar procedure as in Example 2 except that methyl ethyl ketone was used instead of ethanol. All of the modified dyes thus obtained were soluble in aliphatic hydrocarbon solvent and insoluble water and had the same colours as the original dyes.

EXAMPLE 5

To aliphatic hydrocarbon solvents kept at a temperature of about 70°C were added resinous binders with stirring, and further organic ammonium compounds to be reacted with dyes were added slowly with stirring to effect complete solution. Subsequently, dyes were added slowly to the resulting solutions, followed by stirring for 1½ hours and then by cooling to room temperature. The filtration of insoluble precipitates gave ink compositions of the present invention as shown in Table 12 below.

Table 10

| No. | Dye Name*[1] | Amount used (part) | Amine salts Comp. No.*[2] | Amount used (part) | Amount of modified dye obtained (part) |
|---|---|---|---|---|---|
| 40 | A.Y. 36 | 7 | 66 | 4 | 10 |
| 41 | A.Y. 198 | 6 | 84 | 4 | 9 |
| 42 | A.Blu.117 | 6 | 68 | 4 | 8.5 |
| 43 | A.R. 134 | 7 | 81 | 9 | 15 |
| 44 | A.R. 154 | 8 | 83 | 7 | 13 |
| 45 | A.Blu.120 | 7 | 94 | 4 | 10 |
| 46 | A.Blu. 40 | 7 | 90 | 6 | 12 |
| 47 | A.V. 43 | 7 | 93 | 6 | 11 |
| 48 | A.Blu. 9 | 6 | 96 | 5 | 9.5 |
| 49 | A.Blu. 15 | 6 | 97 | 3 | 8 |
| 50 | A.V. 15 | 7 | 72 | 4 | 10 |
| 51 | A.G. 16 | 9 | 80 | 5 | 12.5 |

Note:
*[1] "A.V." stands for "Acid Violet" and "A.Y.", "A.Blu.", "A.R." and "A.G." are the same as in Examples 1 – 3.
*[2] Compound Nos. 66 to 97 correspond to compound Nos. 66 to 97 attached to the examples of amine salts shown in Table 3 before.

Ink compositions shown in Table 11 below were prepared by the same procedure as in Example 3.

Table 11

| No. | Amount of modified dye used (part) | Amount of resinous binder used (part) | Solvent used (part) | | | Colour of the ink composition |
|---|---|---|---|---|---|---|
| 40 | 10 | 15*[1] | Refined gasoline*[3] (50) | | | Reddish yellow |
| 41 | 8.5 | 13*[1] | " | | | Red |
| 42 | 10 | 12*[1] | Refined gasoline*[3] (60) | | | Purplish blue |
| 43 | 13 | 19*[1] | Aliphatic hydro-*[4] carbon (20) | + | Ligroin (35) | Purplish red |
| 44 | 12 | 14*[2] | Petroleum spirit (30) | + | n-Heptane (20) | Bluish red |
| 45 | 11 | 14*[2] | Petroleum spirit (35) | + | n-Heptane (15) | Purplish blue |
| 46 | 13 | 15*[2] | Petroleum spirit (60) | | | Greenish blue |
| 47 | 10 | 16*[2] | Refined gasoline*[3] (25) | + | n-Heptane (25) | Violet |
| 48 | 10 | 10*[2] | Refined gasoline*[3] (45) | + | n-Heptane (15) | Greenish blue |
| 49 | 10 | 13*[2] | Refined gasoline*[3] (50) | + | n-Heptane (10) | Light blue |
| 50 | 12 | 18*[2] | Refined gasoline*[3] (50) | + | n-Heptane (10) | Bluish purple |
| 51 | 13 | 11*[3] | Petroleum spirit (30) | + | Ligroin (20) | Bluish green |

Note:
*[1] Polyolefin, "Nisseki Neopolymer 140" the same as in Example 3.
*[2] Ester gum, "Pensel KK", trademark, product of Arakawa Rinsan Kagaku Kogyo Kabushiki Kaisha, Japan.
*[3] Polyolefin, "Piccopale", trademark, product of Esso-Standard Oil Co., Ltd., U.S.A.
*[4] "Rubbersol" the same as in Example 1.

Table 12

| No. | Dye Name*[1] | Amount used (part) | Organic ammonium compound Comp. No.*[2] | Amount used (part) | Amount of resinous binder (part) | Solvent used (part) | | | Colour of the ink composition |
|---|---|---|---|---|---|---|---|---|---|
| 52 | A.R.158 | 8 | 14 | 10 | 13*[3] | Refined gasoline*[13] (50) | + | n-Heptane (20) | Red |
| 53 | D.G. 6 | 6 | 21 | 9 | 13*[4] | Aliphatic hydro-*[14] (20) | + | n-Heptane (20) | Dark green |

Table 12-continued

| No. | Dye Name*[1] | Amount used (part) | Organic ammonium compound Comp. No.*[2] | Amount used (part) | Amount of resinous binder (part) | Solvent used (part) | | | Colour of the ink composition |
|---|---|---|---|---|---|---|---|---|---|
| 54 | A.Blu.1 | 7 | 26 | 6 | 15*[5] (50) | Aliphatic hydro-*[14] carbon (40) | + | n-Heptane (20) | Greenish blue |
| 55 | A.R.37 | 7 | 35 | 9 | 15*[6] | Refined gasoline*[13] (40) | + | Aliphatic*[14] hydro-carbon (25) | Red |
| 56 | A.Bla.51 | 10 | 42 | 10 | 14*[7] | Aliphatic hydro-*[14] carbon (35) | + | Ligroin (20) | Bluish black |
| 57 | A.O. 24 | 7 | 49 | 7 | 16*[8] | Refined*[13] gasoline (35) | + | Aliphatic*[14] hydro-carbon (30) | Brown |
| 58 | A.G. 25 | 8 | 59 | 10 | 14*[9] | Refined gasoline*[13] (40) | + | n-Heptane (20) | Bluish green |
| 59 | A.Blu.161 | 6 | 64 | 5 | 14*[10] | Refined gasoline*[13] (50) | + | n-Octane (15) | Violet |
| 60 | D.R. 2 | 6 | 79 | 3 | 14*[11] | Ligroin (35) | + | n-Heptane (15) | Crimson |
| 61 | A.D.45 | 8 | 99 | 5 | 13*[12] | Refined gasoline*[13] (35) | + | n-Octane (25) | Red |

Note:
*[1] "A.R.", "D.G.", "A.Blu.", "A.Bla.", "A.O.", "A.G." and "D.R." are the same as in Examples 1 to 4.
*[2] Compound Nos. 14 to 99 respectively correspond to compound Nos. 14 to 99 attached to the examples of organic ammonium compound shown in Tables 1 – 3.
*[3] Pentaerythritol-rosin ester, "Pentaester" the same as in Example 1.
*[4] Alkyd resin modified with rosin, "Beckosol", trademark, product of Nihon Reichhold Co. Ltd., Japan.
*[5] Ester gun, "Pensel KK" the same as in Example 4.
*[6] Polyolefin, "Nisseki Neopolymer 120" the same as in Example 3.
*[7] Styrenated alkyd resin, "Styresol J-718", trademark, product of Nihon Reichhold Co., Ltd., Japan.
*[8] Polyolefin, "Nisseki Neopolymer 140" the same as in Example 3.
*[9] Polyolefin, "Piccopale" the same as in Example 4.
*[10] Polyolefin, "Petrosin 120" the same as in Example 2.
*[11] Maleinized rosin, "MRG-S", trademark, product of Tokushima Seiyu Co. Ltd., Japan.
*[12] Pentaerythritol-hydrogenated rosin ester, "Pentaester H" the same as in Example 2.
*[13] "Robbersol" the same as in Example 1.
*[14] "Isoper E" the same as in Example 2.

What we claim is:

1. An ink composition for a marking pen consisting of a substantially odorless and nontoxic aliphatic hydrocarbon solvent having dissolved therein 5 to 35% by weight of a resinous binder in the form of a rosin derivative and 5 to 20% by weight of a modified dye, all % weights being based on the weight of the composition, said modified dye being a reaction product obtained by reacting (a) an anthraquinone dye having at least one group of —$CO_2M$ and —$SO_3M$ in the molecule wherein M is an alkali metal with (b) an organic ammonium compound represented by the formula

wherein $R_1$, $R_2$, $R_3$ and $R_4$ are respectively a hydrocarbon radical having 1 to 40 carbon atoms, a radical of a hydrocarbon bonded to a hydrocarbon by a divalent group of —O—, —S—, —COO—, —CONH— or —NH—, the total carbon number of both hydrocarbons bonded being in range of 2 to 40, or

$R'$ being an alkyl having 1 to 15 carbon atoms or an alkenyl having 1 to 20 carbon atoms, provided that the total carbon number of $R_1$, $R_2$, $R_3$ and $R_4$ is in the range of 11 to 55 and X is a halogen atom, said modified dye having a high solubility in said solvent whereby drying of the ink in the pen nib is minimized.

2. The ink composition according to claim 1, wherein said X is chlorine atom.

3. The ink composition according to claim 1, wherein said dye to be modified has one to two —$CO_2Na$ groups, one to two —$SO_3Na$ groups or both —$CO_2Na$ and $SO_3Na$ groups.

4. The ink composition of claim 1 wherein the dye is Acid-blue 43 and the rosin derivative is pentaerythritolhydrogenated rosin ester.

* * * * *